July 3, 1945.   E. M. KENNEDY   2,379,529
CAP FOR GREASE FITTINGS
Filed Feb. 17, 1944

INVENTOR.
Earl M. Kennedy
BY Evans + McCoy
ATTORNEYS

Patented July 3, 1945

2,379,529

UNITED STATES PATENT OFFICE 2,379,529

CAP FOR GREASE FITTINGS

Earl M. Kennedy, Cleveland, Ohio

Application February 17, 1944, Serial No. 522,749

2 Claims. (Cl. 138—89)

The device of the present invention is a protective cap for grease fittings of the type commonly attached to automobile bearings to provide an inlet for grease introduced through a grease gun nozzle adapted for connection to the fitting.

The principal objects of the present invention are to provide a protective cap of rubber or rubberlike elastic material for fittings of the character referred to that will prevent entry of moisture and dirt to the nozzle engaging head of the fitting so that grease forced into the bearing through the fitting will not be contaminated by grit accumulated on the end of the fitting; to provide a cap that will serve as a protective buffer to absorb impacts such as the accidental impact of a wrench, hammer or other tool, or of a stone or other object thrown up from the road bed; and also to provide a combined buffer and cap having a socket so formed that the interior of the cap is held out of contact with the outer end of the fitting so that adhesion of rubber to the end of the fitting and contamination of the grease by particles of rubber is avoided.

With the above and other objects in view the invention may be said to comprise the device illustrated in the accompanying drawings hereinafter described and particularly set forth in the appended claims together with such variations and modifications thereof as will be apparent to one skilled in the art to which the invention pertains. Reference should be had to the accompanying drawing forming a part of this specification in which:

Figure 1:
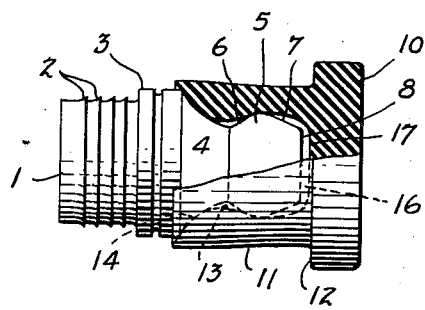
Figure 1 is a side elevation showing the cap of the present invention applied to a fitting, a portion of the cap being broken away and shown in section.
Figure 2:
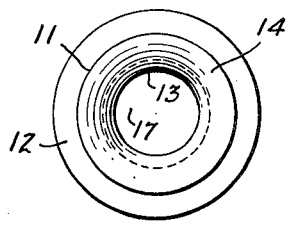
Fig. 2 is a plan view of the cap looking toward the inner end thereof.
Figure 3:
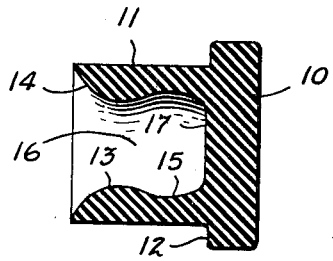
Fig. 3 is an axial section through the cap.

In Fig. 1 of the drawing the device of the present invention is shown applied to a conventional fitting of the type commonly used on automobile bearings, the fitting being provided with a shank 1 that is adapted to have a press fit in a bored opening leading to a bearing. The shank 1 may be provided with suitable sealing fins 2 and with a circumferential positioning rib 3 adapted to seat upon the member to which the fitting is applied. Outwardly of the positioning rib the fitting is provided with an outwardly tapering shoulder 4 and with an enlarged head 5. The head 5 has a tapering inner shoulder 6 that is opposed to a shoulder 4 and forms therewith a restricted neck portion on the fitting inwardly of the head 5. The head 5 has a tapering outer end portion 7 and a flat end face 8 to which the grease passage opens.

The device of the present invention is a cap adapted to be detachably secured upon the fitting to prevent entry of moisture and dirt to the nozzle engaging portion of the fitting and also serving as a protective buffer to prevent accidental injury to the fitting. The cap of the present invention has a relatively thick head or buffer portion 10 and an external cylindrical socket portion 11 which is of less diameter than the head portion 10, the head portion 10 forming an annular projecting shoulder 12 around the outer end of the socket portion 11 which provides a convenient hand grip for removal of the cap from the fitting. The head or buffer 10 because of its larger diameter affords protection against lateral impacts. The tubular wall of the socket portion 11 is thickened intermediate the ends thereof to provide a restricted gripping portion 13. The interior surface of the tubular wall is convex in axial section over the restricted portion 13 and flares outwardly to the inner open end of the socket to provide a tapering face 14 to facilitate the entry of the head 5 of the fitting into the socket. Inwardly of the restricted portion 13 the socket wall has a relatively flexible inner portion 15 which forms the peripheral wall of a head receiving chamber 16 that is of a depth somewhat greater than the depth of the outer portion of the head 5 of the fitting, the recess having a flat bottom 17 which is spaced outwardly from the end face 8 of the fitting when the cap is in place on the fitting. When the open end of the cap is pressed axially against the head 5 of the fitting the restricted portion 13 is forced inwardly over the tapered end portion 7 of the head 5 and is moved inwardly until the flaring end portion 14 engages the shoulder 4 of the fitting and the restricted portion 13 is contracted into the neck portion of the fitting between the tapered surfaces 4 and 6 thereof.

The flexible inner portion 15 of the tubular wall is adapted to yield slightly under axially applied pressure so that if the head 10 is pressed into engagement with the end 8 of the fitting when it is applied thereto the resilience of the wall portion 15 will cause the head 10 to be sprung out of contact with the end 8 of the fitting when pressure is released. The internal diameter of the head receiving chamber 16 is such that the cylindrical wall 15 does not contact with the outer inclined face portion 7 of the head 5.

The supporting of the head out of contact with the portion of the fitting that engages with the grease gun nozzle is advantageous in that there is no danger of adhesion of the rubber to the metal which might break away from the body of the cap due to deterioration of the rubber when left for a long period of time on a fitting. The spacing of the head portion 10 of the cap from the end of the fitting in addition to preventing adhesion of rubber to the nozzle engaging faces, provides a more resilient support for the head 10 permitting greater movement of the head in any direction when it is subjected to impact and thereby affording better protection for the fitting against damage due to impact.

While the cap of the present invention is preferably made of rubber it is to be understood that various resilient rubber-like plastic materials may be employed.

It will be apparent that the device of the present invention provides an effective seal against the entry of moisture and dirt to the grease receiving end of the fitting, that the cap provides effective protection against damage due to accidental impact of hard objects against the fitting and that the grease receiving end of the fitting will not be contaminated by the material of the cap.

It is to be understood that variations and modifications of the specific device herein shown and described for purposes of illustration, may be made without departing from the spirit of the invention.

What I claim is:

1. The combination with a grease fitting having a nozzle engaging head and a restricted neck portion, of a protector for the fitting comprising a cap composed of resilient rubberlike material and having a tubular head receiving socket portion and a relatively thick buffer head closing the outer end of said tubular portion and providing an annular shoulder at the outer end of said cap, the tubular wall of said socket portion having a thickened portion intermediate its ends to provide a gripping portion of an internal diameter less than the diameter of the head of the fitting, said thickened portion having an interior face convex in axial section and flaring to the outer end of said socket portion, the inner portion of said socket recess being of a diameter and depth greater than the outer end portion of said fitting, and the portion of the tubular wall adjacent the head being adapted to yield slightly under the pressure applied axially to force the cap onto a fitting and to spring back to normal shape upon release of such pressure to hold the cap out of contact with the outer end of said fitting.

2. A protected grease fitting comprising in combination a fitting having a nozzle engaging head, a tapering shoulder inwardly of the head and a restricted neck portion between said head and shoulder, and a one piece cap composed of resilient rubber-like material and having a relatively thick buffer head and a tubular head receiving socket portion of less diameter than the head and projecting from one side thereof, said socket portion having a tubular wall that is thickened intermediate its ends to provide a portion of less diameter than the head for gripping engagement with said shoulder and the inner portion of the head, said tubular wall tapering from its open end for wedging engagement with said shoulder, said socket portion having a socket receiving chamber between the restricted portion and head that is of greater depth than said head, whereby said cap is normally supported with the tapering wall of the socket portion in wedging engagement with said tapering shoulder and with the buffer head spaced from the outer end of the fitting.

EARL M. KENNEDY.